United States Patent
Levisse et al.

(10) Patent No.: US 12,000,344 B2
(45) Date of Patent: Jun. 4, 2024

(54) AIRCRAFT TURBINE ENGINE WITH AN OFF-AXIS PROPELLER

(71) Applicants: SAFRAN AIRCRAFT ENGINES, Paris (FR); SAFRAN TRANSMISSION SYSTEMS, Colombes (FR)

(72) Inventors: Paul Ghislain Albert Levisse, Moissy-Cramayel (FR); Julien Fabien Patrick Becoulet, Moissy-Cramayel (FR); Guillaume Pierre Mouly, Moissy-Cramayel (FR); Patrice Jocelyn Francis Gedin, Moissy-Cramayel (FR); Olivier Belmonte, Moissy-Cramayel (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/932,934

(22) Filed: Sep. 16, 2022

(65) Prior Publication Data

US 2023/0133871 A1 May 4, 2023

(30) Foreign Application Priority Data

Sep. 17, 2021 (FR) .................................... 2109787

(51) Int. Cl.
*F02C 7/36* (2006.01)
*F16H 1/36* (2006.01)

(52) U.S. Cl.
CPC ................ *F02C 7/36* (2013.01); *F16H 1/36* (2013.01); *F05D 2220/323* (2013.01); *F05D 2220/36* (2013.01); *F05D 2260/40311* (2013.01)

(58) Field of Classification Search
CPC ............. F02C 7/36; F05D 2260/40311; F05D 2220/323; F05D 2220/36; F16H 1/28; F16H 1/36
See application file for complete search history.

(56) References Cited

U.S. PATENT DOCUMENTS 9,302,148 B1 * 4/2016 Vujicic ............... A63B 22/0664
11,268,453 B1 * 3/2022 Desjardins ............. F16H 57/04
(Continued)

FOREIGN PATENT DOCUMENTS

| FR | 3 026 389 A1 | 4/2016 |
| FR | 3 031 562 A1 | 7/2016 |
| FR | 3 034 158 A1 | 9/2016 |

OTHER PUBLICATIONS

Great Britain Search Report mailed Feb. 27, 2023, issued in Application No. GB2212929.0, 3 pages.
(Continued)

*Primary Examiner* — Elton K Wong
(74) *Attorney, Agent, or Firm* — CHRISTENSEN O'CONNOR JOHNSON KINDNESS PLLC

(57) ABSTRACT

An aircraft turbine engine includes a turbine shaft having a first axis of rotation, a propulsion propeller having a second axis of rotation parallel to and spaced from the first axis, and a mechanical reduction gear coupled to the turbine shaft and rotating the propeller. The reduction gear has a sun gear connected to the turbine shaft, a ring gear, and at least two planet gears, each including a first external toothing that is meshed with an external toothing of the sun gear. A second external toothing is located within the ring gear and is meshed with an internal toothing of the ring gear.

10 Claims, 9 Drawing Sheets

(56) References Cited

U.S. PATENT DOCUMENTS

| | | | | |
|---|---|---|---|---|
| 2015/0354502 A1* | 12/2015 | Kuhne | ............... | F02K 3/072 60/226.1 |
| 2016/0376984 A1* | 12/2016 | Sheridan | ............. | F01D 25/18 60/805 |
| 2018/0128183 A1* | 5/2018 | Escure | ............... | B64D 35/06 |
| 2020/0300340 A1* | 9/2020 | Desjardins | ............ | F16H 1/28 |
| 2021/0270189 A1 | 9/2021 | Hrubec et al. | | |
| 2023/0019363 A1* | 1/2023 | Garabello | ........... | F01D 25/164 |

OTHER PUBLICATIONS

French Search Report mailed May 4, 2022, issued in Application No. FR2109787, filed Sep. 17, 2021, 2 pages.

* cited by examiner

AIRCRAFT TURBINE ENGINE WITH AN OFF-AXIS PROPELLER

CROSS-REFERENCE TO RELATED APPLICATION

This application claims priority to FR 2109787, filed Sep. 17, 2021, the disclosure of which is hereby expressly incorporated by reference herein in its entirety.

TECHNICAL FIELD

The present disclosure relates to an aircraft turbine engine comprising a turbine shaft and a propulsion propeller which have parallel but offset axes of rotation.

BACKGROUND

The technical background includes, in particular, the documents FR-A1-3 031 562, FR-A1-3 034 158, US-A1-2018/128183, US-A1-2021/270189 and FR-A1-3 026 389.

An aircraft turbine engine classically comprises a gas generator which comprises from upstream to downstream, in the direction of flow of the gases in operation, at least one compressor, an annular combustion chamber, and at least one turbine. The turbine comprises a shaft which rotates about an axis of rotation and drives a propeller located generally upstream of the gas generator.

The propeller may be ducted and called a fan, or it may be unducted. It is connected to a propeller shaft which has an axis of rotation parallel to the axis of the turbine.

The newer generations of dual flow turbine engine, in particular, those with high bypass ratios, comprise a mechanical reduction gear to drive the shaft of the propeller. Typically, the purpose of the reduction gear is to transform the so-called fast rotation speed for the shaft of the power turbine into a slower rotation speed for the shaft of the fan.

Such a reduction gear comprises a central pinion, called the sun gear, a ring gear and pinions called planet gears, which are engaged between the sun gear and the ring gear. The planet gears are held in place by a frame called a planet carrier.

There are several reduction gear architectures. In the prior art of the dual flow turbine engines, the reduction gears are of the planetary or epicyclic type. In other similar applications, there are so-called differential or "compound" architectures.

On a planetary reduction gear, the planet carrier is fixed and the ring gear consists of the output shaft of the device, which turns in the opposite direction to the sun gear.

On an epicyclic reduction gear, the ring gear is fixed and the planet carrier is the output shaft of the device which rotates in the same direction as the sun gear.

On a compound reduction gear, no element is fixed in rotation. The ring gear rotates in the opposite direction to the sun gear and the planet carrier.

To increase the bypass ratio of a turbine engine, it is known to increase the diameter of its propeller. However, the larger the diameter of the propeller, the bulkier the turbine engine is in the radial direction with respect to the axis of the turbine.

FIG. 1 shows a turbine engine 10 suspended under the wing 12 of an aircraft. The diameter D1 of the propeller 14 may be limited by the ground clearance that must be maintained between the propeller 14 and the ground 16, i.e., the safety distance H1 between the propeller 14 and the ground 16. This safety distance prevents impacts between the turbine engine 10 and the ground 16 during extreme maneuvers.

A solution to increase the diameter D1 of the propeller 14 while maintaining sufficient ground clearance would be to increase the height H2 of the landing gear 18. However, this solution would not be satisfactory as it would have too great an impact on the weight of the landing gear 18 and on the aircraft.

Another solution would be to mount the turbine engine 10 elsewhere than under the wing 12, but this solution would be complex and costly in particular because it would have a significant impact on the weight and structure of the aircraft.

The ideal solution to this problem is therefore to offset the propeller 14 from the turbine 20. The propeller 14 is driven by a shaft which then has an axis of rotation 22 parallel to and at a distance from the axis of rotation 24 of the shaft of the turbine 20. It is then possible to position the axis 22 of the propeller 14 vertically above the axis 24 of the turbine so that the increase in the diameter D1 of the propeller 14 is compensated for by an increase in the center distance R between the propeller and turbine shafts.

In the present technique shown in FIG. 2, a power transmission system 26 is interposed axially between the shaft 28 of the turbine 20 and the reduction gear 32 to allow this misalignment between the axes 22, 24. This transmission system 26 comprises meshed pinions 34, for example beveled. The disadvantage of this solution is that it significantly impacts the length and therefore the axial bulk of the turbine engine 10. Another potential disadvantage is that it does not allow the mechanical moments that are applied to the various meshings of the reduction gear and transmission system 26 to be managed effectively during operation.

The present disclosure provides an improvement which provides a simple, effective and economical solution to at least some of the above problems.

SUMMARY

The disclosure relates to an aircraft turbine engine, comprising:
  a turbine shaft having a first axis of rotation
  a propulsion propeller connected to a propeller shaft having a second axis of rotation parallel to and spaced from the first axis, and
  a mechanical reduction gear coupled to the turbine shaft and configured to drive in rotation the propeller shaft, the reduction gear comprising a sun gear, a ring gear and at least two planet gears meshed with the sun gear and the ring gear,
  characterized in that
  the turbine shaft is connected to the sun gear,
  the propeller shaft is connected to the ring gear, which comprises an internal toothing,
  each of the planet gears comprises a first external toothing which is located outside the ring gear and which is meshed with an external toothing of the sun gear, and a second external toothing which is located inside the ring gear and which is meshed with the internal toothing of the ring gear.

The present disclosure thus proposes to integrate the property of misalignment between the turbine and the propeller into the reduction gear, thus avoiding the need to combine a reduction gear and a power transmission system for misalignment. The use of a reduction ring gear with internal toothing is particularly advantageous because the internal space of the ring gear can be occupied at least in part by the planet gears meshed with this ring gear, as well as by one or more equipment for example.

The turbine engine according to the disclosure may comprise one or more of the following features, taken in isolation from each other, or in combination with each other:

the sun gear and planet gears are located below a horizontal plane passing through the second axis, the turbine engine further comprises an equipment comprising a shaft carrying a pinion, this pinion being meshed with the toothing of the ring gear and located above the horizontal plane, the first toothing of each planet gear is directly meshed with the external toothing of the sun gear, the first toothing of each planet gear is meshed via at least one pinion with the toothing of the sun gear, the planet gears are evenly distributed around the second axis, the toothing of the sun gear is meshed with the planet gears via a single pinion which is aligned with the second axis, the toothing of the sun gear is meshed with the planet gears via identical K pinions, K being the number of planet gears and each of the pinions being mounted between the sun gear and one of the planet gears, the pinions are non-regularly distributed around the second axis, the toothing of the sun gear are engaged with the planet gears by means of K pinions, at least two of which are different, K being the number of planet gears and each of the pinions being mounted between the sun gear and one of the planet gears, the pinions are evenly distributed about the second axis, the toothing of the sun gear and the first toothing of each planet gear are each double-stage and each comprise two annular rows of teeth located at an axial distance from each other, the number of planet gears is between 2 and 5, and is preferably 2 or 3, the number of pinions is at least 1, the diameter of the ring gear, and in particular of its teeth, is greater than 2 or even 2.5 times the maximum diameter of the planet gears.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
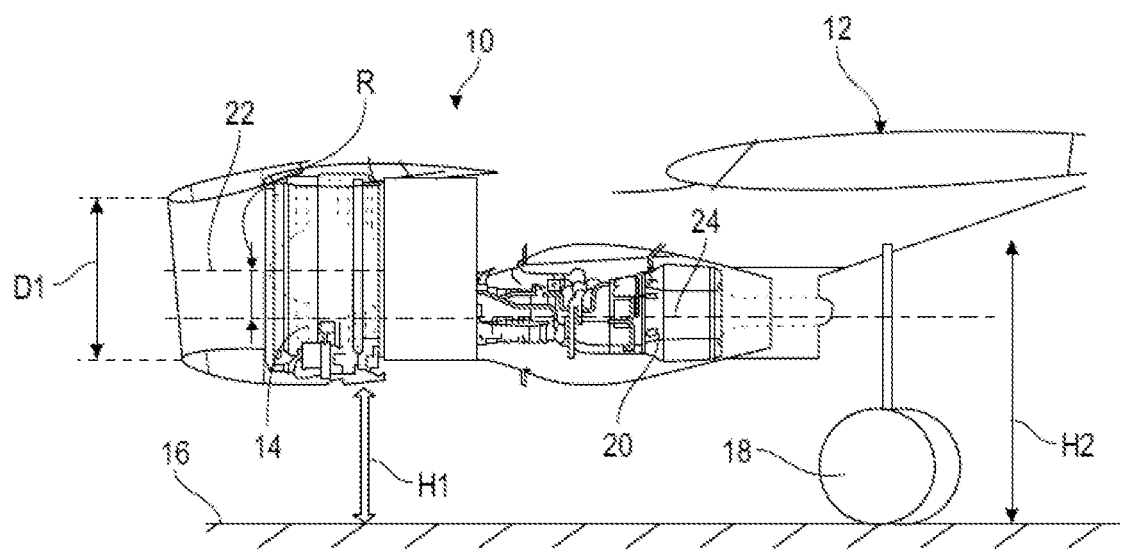
FIG. 1 is a schematic axial sectional view of a turbine engine and landing gear attached under the wing of an aircraft.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

Generally speaking, a turbine engine 10 comprises a propeller 14 and a gas generator which comprises from upstream to downstream at least one compressor 36, an annular combustion chamber 38, and at least one turbine 40.

Figure 2:
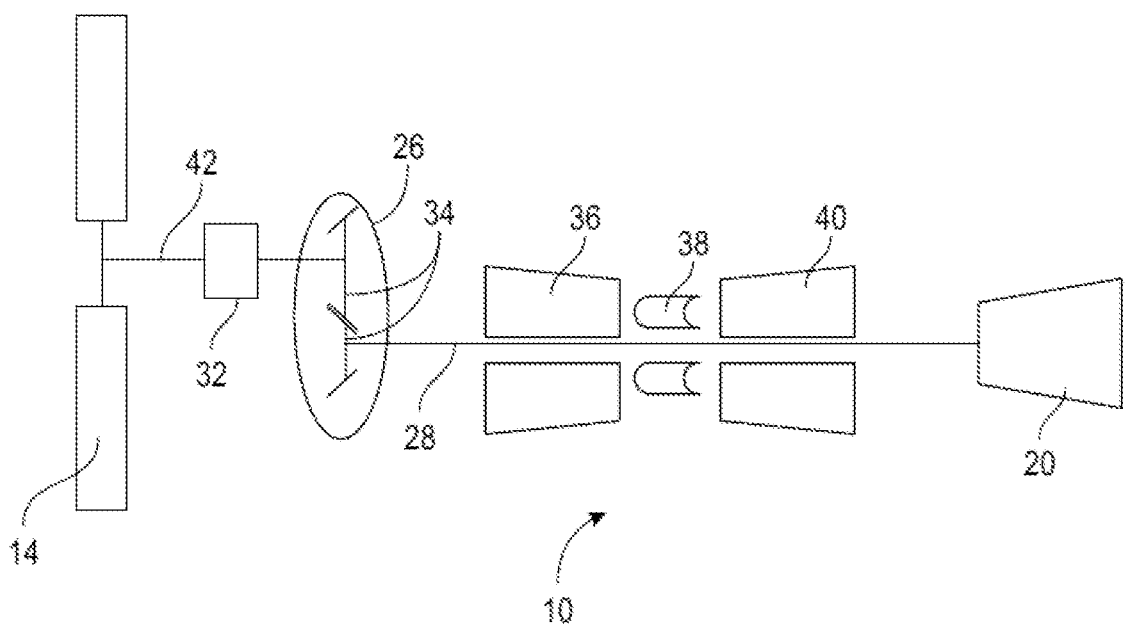
FIG. 2 is a very schematic axial cross-sectional view of an aircraft turbine engine with the propeller offset from the turbine.

In the case of FIG. 2, the gas generator comprises a high-pressure compressor 36 and a high-pressure turbine 40, the rotors of which are connected to each other by a high-pressure shaft (not shown). This shaft and the rotors of the compressor 36 and the turbine 40 form a high-pressure body. The gas generator also comprises a low-pressure turbine 20 located downstream of the high-pressure casing, the rotor of which is connected to the shaft 28. This shaft 28 passes through the high-pressure casing and its upstream end is coupled to the shaft 42 of the propeller 14 by a reduction gear in accordance with the disclosure.

Figure 3:
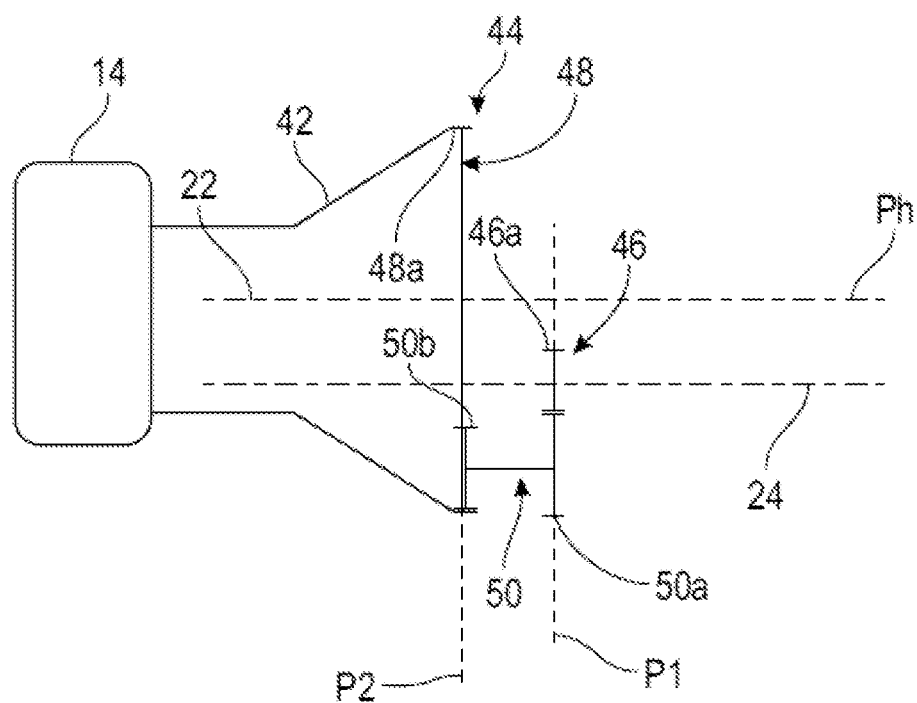
FIG. 3 is a very schematic axial sectional view of a reduction gear for a turbine engine with an off-axis propeller according to the disclosure.
Figure 4:
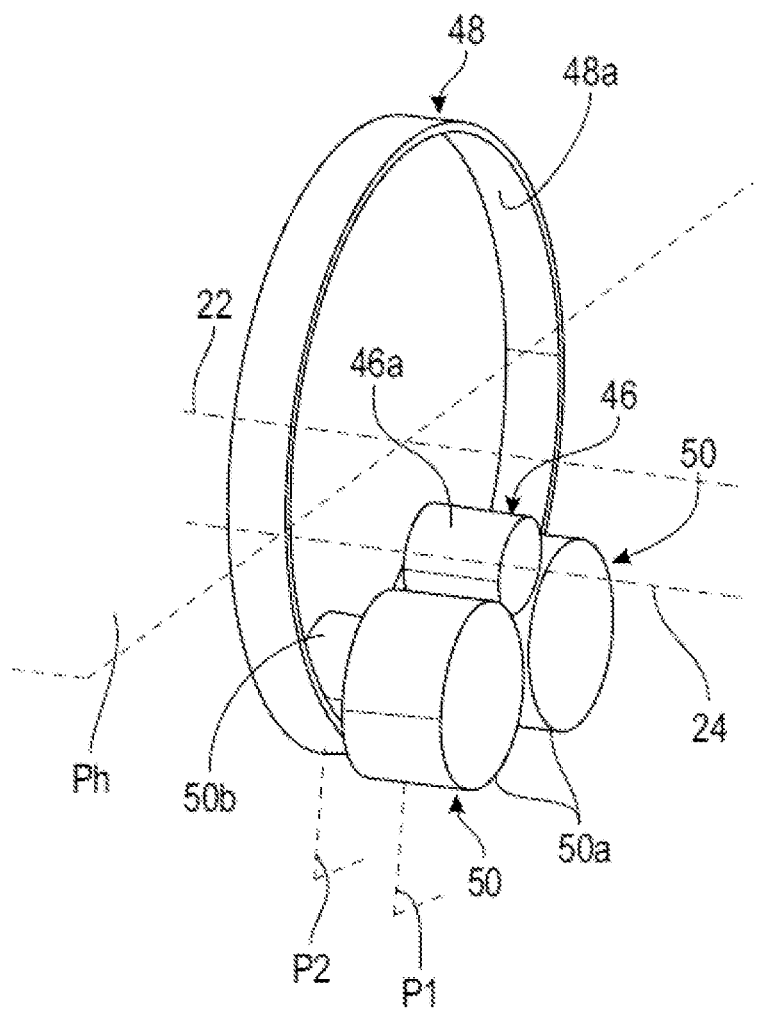
FIG. 4 is a schematic perspective view of the reduction gear of FIG. 3.

FIGS. 3 and 4 illustrate a first embodiment of the mechanical reduction gear 44.

The reduction gear 44 comprises a sun gear 46, a ring gear 48 and at least two planet gears 50 meshing with the sun gear 46 and the ring gear 48. The planet gears 50 are carried by a planet carrier (not shown) which is fixed and forms part of a stator of the turbine engine 10. Each of the planet gears 50 has an axis of rotation parallel to the axes 22, 24.

The ring gear 48 has the particularity of comprising an internal toothing 48a, i.e. it comprises a ring inside which the toothing 48a is located. The ring gear 48 and its toothing 48a extend substantially in a first transverse plane P2, perpendicular to the axis 24 of the turbine.

The ring gear 48 is connected to the drive shaft 42 of the propeller 14, which has an axis of rotation 22 parallel to the axis 24 and at a distance from this axis 24.

The sun gear 46 comprises an external toothing 46a which extends substantially in a second transverse plane P1 parallel to the plane P2.

The planet gears 50 are two in number in the example shown. Each of the planet gears comprises a first external toothing 50a meshed with the toothing 46a of the sun gear 46 and located substantially in the plane P1, and a second external toothing 50b meshed with the toothing 48a of the ring gear 48 and located substantially in the plane P2. It is therefore understood that the first toothings 50a of the planet gears 50 are located outside the ring gear 48 and that the second toothings 50b of the planet gears 50 are housed inside the ring gear 48. The planet gears 50 are partly engaged in the ring gear 48.

FIGS. 3 and 4 show that the diameters of the toothing 46a, 50a, 50b of the sun gear 46 and of the planet gears 50 are significantly smaller than the diameter of the ring gear 48 and its toothing 48a.

In some embodiments, the diameter of the ring gear 48 and in particular of its toothing 48a is greater than 2 or 2.5 times the maximum diameter of the planet gears 50.

The toothings 46a, 50a, 50b of the sun gear 46 and the planet gears 50 may be straight or herringbone. The use of herringbone toothing allows to limit the axial length of the reduction gear 44, which allows to optimize the size of the turbine engine 10.

Ph is defined as a horizontal plane passing through the axis 22 of the propeller shaft 42. This plane Ph intersects the ring gear 48 in two halves, upper and lower respectively. The figures show that the sun gear 46 and the planet gears 50 are arranged under this plane Ph and are therefore located in the lower part or half of the ring gear 48. The sun gear 46 is here arranged between the planet gears 50 and slightly above them. These planet gears 50 are identical here.

The upper part or half of the ring gear 48 and in particular its inner space, is therefore left free.

Figure 5:
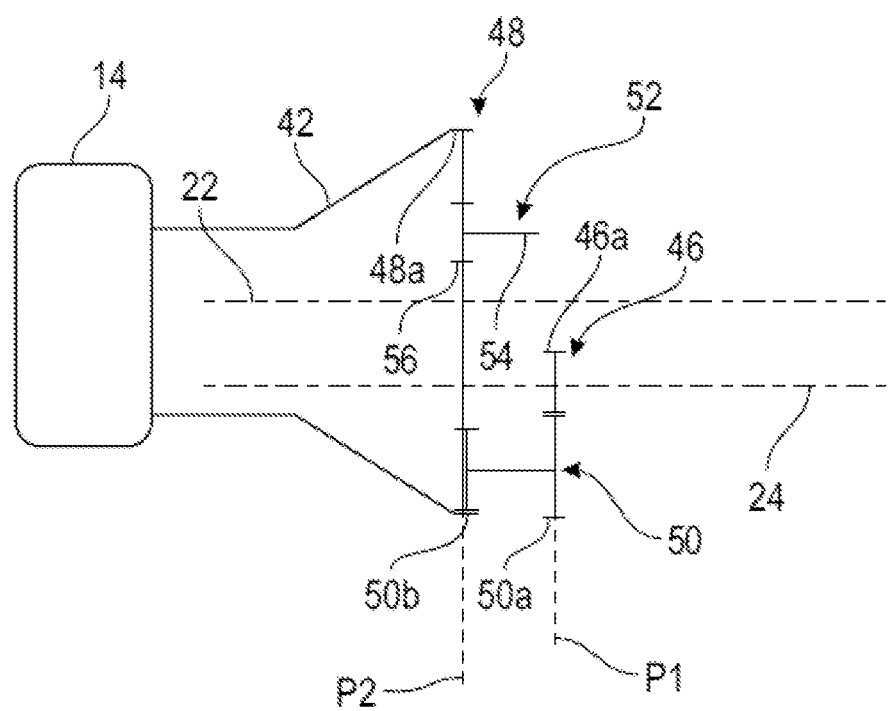
FIG. 5 is a view similar to that of FIG. 3 and illustrating an alternative embodiment of the reduction gear.

FIG. 5 illustrates an alternative embodiment of the reduction gear 44, which is further associated with an equipment 52 (torque sensor, rotating oil transfer, de-icing, etc.).

This equipment 52 comprises a shaft 54 equipped with a pinion 56. The shaft 54 extends parallel to the axes 22, 44 and the pinion 56 is engaged in the ring gear 48 and meshed with the toothing 48a of the ring gear 48.

The equipment 52 is located above the plane Ph and is substantially diametrically opposed with respect to the sun gear 46 and the planet gears 50, so that the equipment 52 loads the ring gear 48 in an area which is diametrically opposed to the area of loading of the ring gear 48 by the planet gears 50. This limits the deformation of the ring gear 48 during operation.

Figure 6:
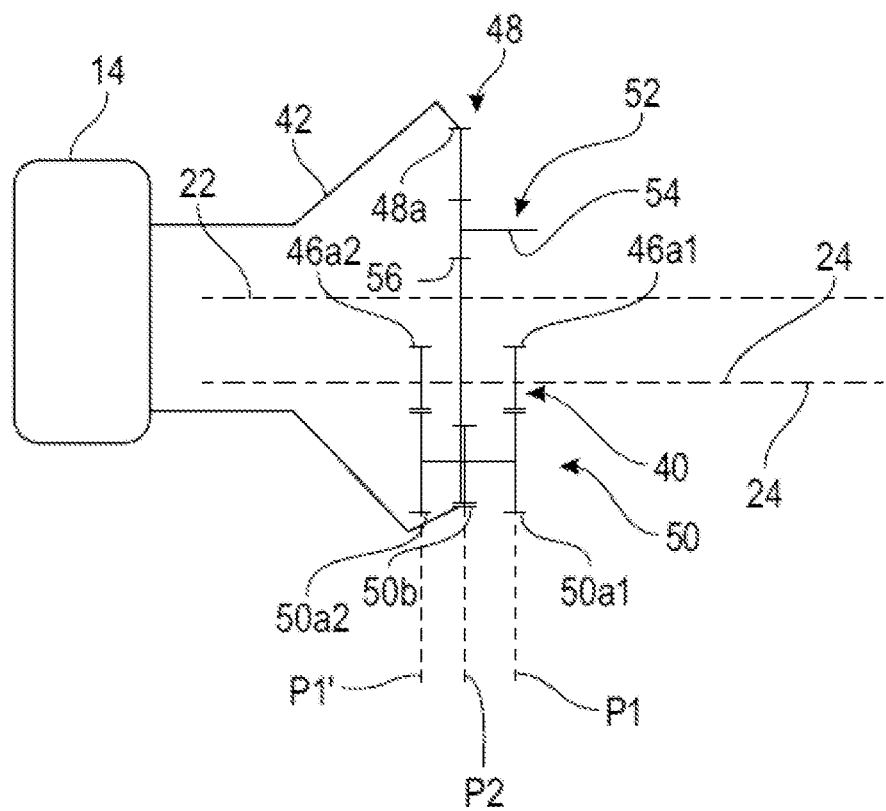
FIG. 6 is a view similar to that of FIG. 3 and illustrating another alternative embodiment of the reduction gear.

FIG. 6 illustrates another variant of the reduction gear 44 in which the toothing 46a of the sun gear 46 and the first toothing 50a of the planet gears 50 are each double-stage. This optimizes the mechanical moments applied within the reduction gear 44 during operation.

In the previous embodiments, these toothings 46a, 50a were single stage, i.e., they comprise a single annular row of teeth which is located in the transverse plane P1.

On the contrary, a double stage toothing comprises two annular rows of teeth which are respectively located in two distinct transverse planes, i.e., these rows of teeth are at an axial distance from each other.

The sun gear 46 thus comprises two annular rows of teeth 46a1, 46a2, which are disposed respectively in two planes P1 and P1' disposed respectively upstream and downstream of the plane P2 of the ring gear 48.

Each planet gear 50 also comprises two annular rows of teeth 50a1, 50a2, which are arranged respectively in the planes P1 and P1' and between which the second toothing 50b is located. The row of teeth 46a1 is meshed with the row of teeth 50a1, and the row of teeth 46a2 is meshed with the row of teeth 50a2. Each of the planet gears 50 is therefore symmetrical with respect to the plane P2, which enables to multiply the contacts between the toothings, to reduce the mechanical moments in operation, and thus to make a much more compact reduction gear 44.

The rows of teeth 46a2 and 46a1 are advantageously herringbone or helical with opposite angles. This type of toothing allows to improve the contacts compared to a conventional "straight" toothing. The fact of distributing these herringbone and/or helical toothings symmetrically between the stages allows, as indicated, to symmetrize the forces and therefore to cancel/limit the mechanical moments.

Figure 7:
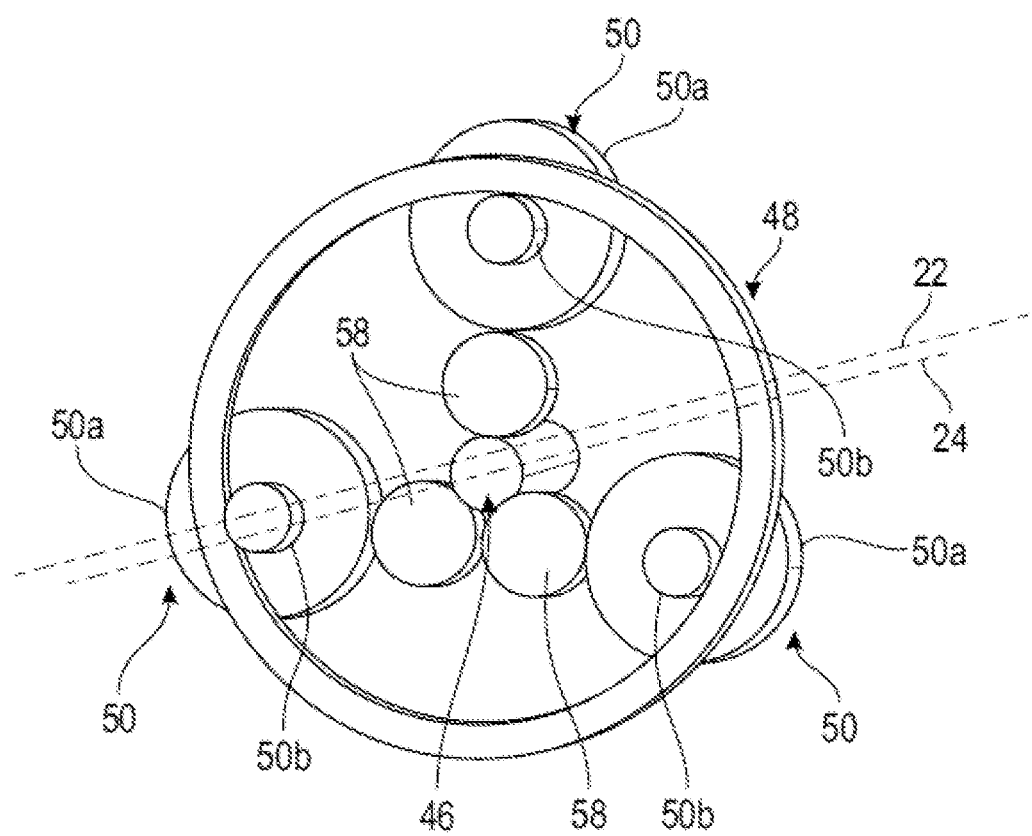
FIG. 7 is a view similar to that of FIG. 4 and illustrating another alternative embodiment of the reduction gear.
Figure 8:
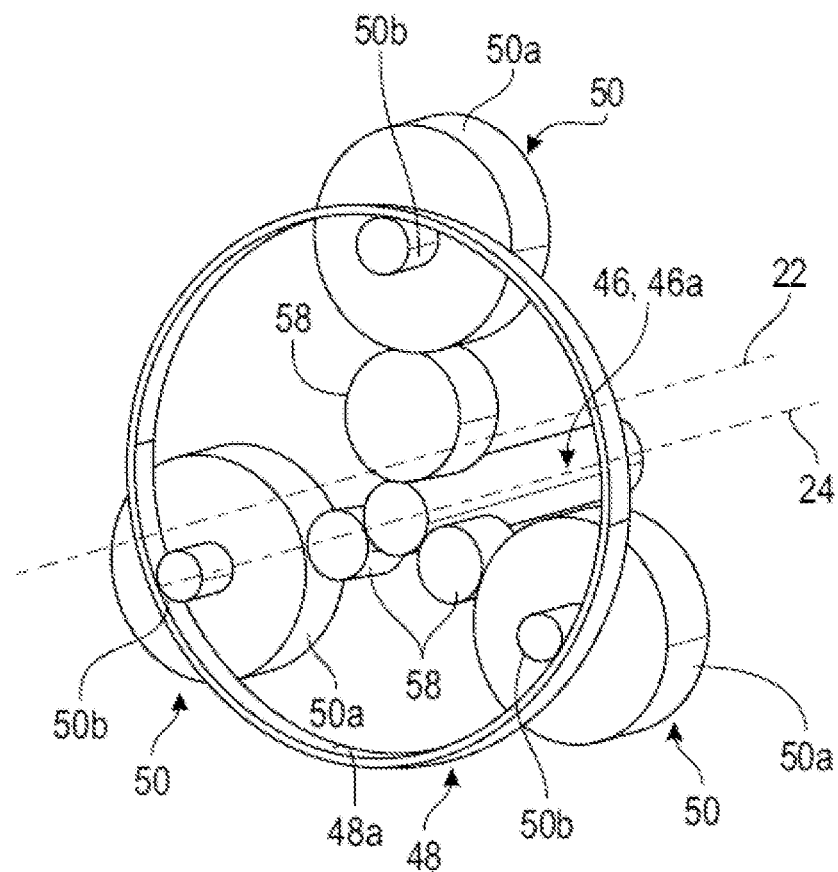
FIG. 8 is a view similar to that of FIG. 4 and illustrating another alternative embodiment of the reduction gear.
Figure 9:
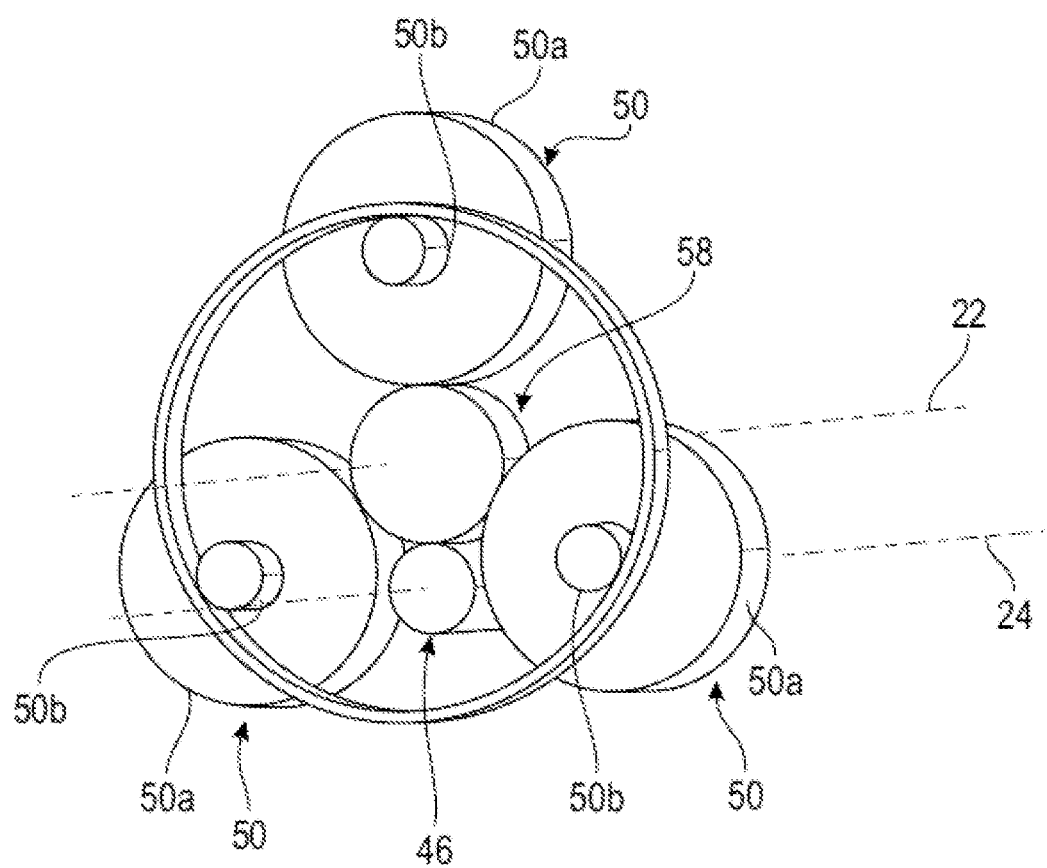
FIG. 9 is a view similar to that of FIG. 4 and illustrating a further alternative embodiment of the reduction gear.

The alternative embodiments of the reduction gear 44 shown in FIGS. 7 to 9 differ from the previous embodiments in that the number and arrangement of the planet gears 50 are different. The number of planet gears 50 is equal to three and they are regularly distributed around the propeller axis 22.

Another difference is that the sun gear 46 is meshed with the planet gears 50 via at least one pinion 58.

In the case of FIG. 7, the number of pinions 58 is three. They are identical and are each arranged between the sun gear 46 and one of the planet gears 50. The number of pinions 58 is therefore equal to the number of planet gears 50. Each pinion 58 meshes with the toothing 46a of the sun gear 46 and with the first toothing 50a of the planet gear 50. Each pinion 58 is therefore located in the plane P1. The pinions 58 are not arranged in a regular manner around the axis 22 of the propeller 14. It is the fact that the intermediate pinions are not evenly spaced around the sun gear 46 that allows to have the above-mentioned center distance.

In the case of FIG. 8, the number of pinions 58 is equal to three. They are different in that one of the pinions 58 has a larger diameter than the other two pinions 58 (which are identical). The pinions 58 are each arranged between the sun gear 46 and one of the planet gears 50. Each pinion 58 meshes with the toothing 46a of the sun gear 46 and with the first toothing 50a of the planet gear 50. Each pinion 58 is therefore located in the plane P1. The pinions 58 may be arranged in a regular manner around the axis 22 of the propeller 14. It is the fact that the pinions 58 do not have the same diameters that allows to have the aforementioned center distance.

In the case of FIG. 9, the number of pinions 58 is equal to one. The pinion 58 is centered on the axis 22 of the propeller 14 and meshes with the first teeth 50a of all the planet gears 50. The pinion 58 is therefore located in the plane P1.

The advantages of the disclosure are multiple and in particular:

a potential gain in mass compared to the configuration of FIG. 2, a misalignment of the axes of the propeller and the turbine and a possibility of increasing the external diameter of the turbine engine, the possibility of accommodating equipment in the free space inside the ring gear, etc.

The embodiments of the invention in which an exclusive property or privilege is claimed are defined as follows:

1. An aircraft turbine engine, comprising:
   a turbine shaft having a first axis of rotation,
   a propulsion propeller connected to a propeller shaft having a second axis of rotation parallel to and spaced from the first axis, and
   a mechanical reduction gear coupled to the turbine shaft and configured to drive in rotation the propeller shaft, the reduction gear comprising a sun gear, a ring gear, and at least two planet gears meshed with the sun gear and the ring gear,
   wherein the turbine shaft is connected to the sun gear,
   wherein the propeller shaft is secured to the ring gear which comprises an internal toothing, wherein each of the planet gears comprises a first external toothing which is located outside the ring gear and which is meshed with an external toothing of the sun gear, wherein each of the planet gears comprises a second external toothing which is located inside the ring gear and which is meshed with the internal toothing of the ring gear, wherein the sun gear and the planet gears are located below a horizontal plane passing through the second axis, and wherein the turbine engine further comprises an equipment comprising a shaft carrying a pinion, wherein the pinion is meshed with the toothing of the ring gear and located above the horizontal plane.

2. The turbine engine according to claim 1, wherein the first toothing of each planet gear is directly meshed with the external toothing of the sun gear.

3. The turbine engine according to claim 1, wherein the first toothing of each planet gear is meshed via at least one pinion with the toothing of the sun gear.

4. The turbine engine according to claim 3, wherein the planet gears are evenly distributed about the second axis.

5. The turbine engine according to claim 3, wherein the toothing of the sun gear is meshed with the planet gears via a single pinion that is aligned with the second axis.

6. The turbine engine according to claim 3, wherein the toothing of the sun gear is meshed with the planet gears via identical K pinions, wherein K is the number of planet gears and each of the pinions is mounted between the sun gear and one of the planet gears.

7. The turbine engine according to claim 6, wherein the pinions are non-regularly distributed about the second axis.

8. The turbine engine according to claim 3, wherein the toothing of the sun gear are meshed with the planet gears by means of K pinions, at least two of which are different, wherein K is the number of planet gears and each of the pinions is mounted between the sun gear and one of the planet gears.

9. The turbine engine according to claim 8, wherein the pinions are evenly distributed about the second axis.

10. The turbine engine according to claim 1, wherein the toothing of the sun gear and the first toothing of each planet gear are each double-stage and each comprises two annular rows of teeth located at an axial distance from each other.

* * * * *